US00RE46082E

(19) United States
(12) Reissued Patent
Kim et al.

(10) Patent Number: US RE46,082 E
(45) Date of Reissued Patent: Jul. 26, 2016

(54) METHOD AND APPARATUS FOR LOW BIT RATE ENCODING AND DECODING

(71) Applicant: SAMSUNG ELECTRONICS CO., LTD., Suwon-si (KR)

(72) Inventors: Junghoe Kim, Seoul (KR); Eunmi Oh, Seoul (KR); Boris Kudryashov, St. Petersburg (RU); Konstantin Osipov, St. Petersburg (RU)

(73) Assignee: SAMSUNG ELECTRONICS CO., LTD., Suwon-si (KR)

(21) Appl. No.: 13/678,413

(22) Filed: Nov. 15, 2012

Related U.S. Patent Documents

Reissue of:
(64) Patent No.: 7,835,907
Issued: Nov. 16, 2010
Appl. No.: 11/312,457
Filed: Dec. 21, 2005

(30) Foreign Application Priority Data

Dec. 21, 2004 (KR) ..... 10-2004-0109267

(51) Int. Cl.
*G10L 25/00* (2013.01)
*G10L 19/00* (2013.01)
(Continued)

(52) U.S. Cl.
CPC ..... *G10L 19/028* (2013.01); *G10L 19/0017* (2013.01)

(58) Field of Classification Search
CPC . G10L 19/00; G10L 19/0017; G10L 19/0019; G10L 19/002; G10L 19/012; G10L 19/02; G10L 19/0204; G10L 19/0208; G10L 19/028; G10L 19/03; G10L 19/18; G10L 19/20; G10L 19/22
USPC ..... 704/200, 200.1, 201, 203, 205, 206, 704/208, 226–228, 230, 500–504
See application file for complete search history.

(56) References Cited

U.S. PATENT DOCUMENTS 5,692,102 A * 11/1997 Pan ..... 704/230
5,886,276 A * 3/1999 Levine et al. ..... 84/603
(Continued)

FOREIGN PATENT DOCUMENTS

JP 10-91196 A 4/1998
JP 10-91196 4/1999
KR 1999-0082402 11/1999

OTHER PUBLICATIONS

Hendriks,. R. et al. "Perceptual linear predictive noise modelling for sinusoid-plus-noise audio coding" International Conf. on Audio, speech and signal Processing vol. 4, 189-92, May 2004.*
(Continued)

*Primary Examiner* — Paras D Shah
(74) *Attorney, Agent, or Firm* — Sughrue Mion, PLLC

(57) ABSTRACT

An apparatus and method of low bit rate encoding and reproducing. The method includes transforming input audio signals in a time domain into spectral signals in a frequency domain, extracting important-spectrum components from the spectral signals in the frequency domain, and quantizing the important-spectrum components, extracting residual-spectrum components other than the important-spectrum components from the spectral signals in the frequency domain, and calculating and quantizing a noise level of the residual-spectrum components, and encoding the quantized important-spectrum components and the quantized noise level losslessly, and outputting encoded bitstreams.

5 Claims, 8 Drawing Sheets

(51) Int. Cl.

| | |
|---|---|
| ***G10L 19/02*** | (2013.01) |
| ***G10L 21/00*** | (2013.01) |
| ***G10L 19/028*** | (2013.01) |

(56) References Cited

U.S. PATENT DOCUMENTS

| | | | | |
|---|---|---|---|---|
| 6,061,649 | A * | 5/2000 | Oikawa et al. | 704/226 |
| 6,263,312 | B1 * | 7/2001 | Kolesnik et al. | 704/500 |
| 6,424,939 | B1 * | 7/2002 | Herre et al. | 704/219 |
| 6,741,960 | B2 * | 5/2004 | Kim et al. | 704/219 |
| 6,766,293 | B1 * | 7/2004 | Herre et al. | 704/226 |
| 6,782,361 | B1 * | 8/2004 | El-Maleh et al. | 704/226 |
| 7,031,269 | B2 * | 4/2006 | Lee | 370/290 |
| 7,246,065 | B2 * | 7/2007 | Tanaka et al. | 704/500 |
| 7,272,566 | B2 * | 9/2007 | Vinton | 704/500 |
| 7,447,631 | B2 * | 11/2008 | Truman et al. | 704/230 |
| 7,634,400 | B2 * | 12/2009 | Averty et al. | 704/205 |
| 8,200,497 | B2 * | 6/2012 | Hardwick | 704/500 |
| 2002/0128828 | A1 * | 9/2002 | Gao | G10L 19/08 704/223 |
| 2003/0088328 | A1 * | 5/2003 | Nishio et al. | 700/94 |
| 2003/0115042 | A1 * | 6/2003 | Chen et al. | 704/200.1 |
| 2006/0015328 | A1 * | 1/2006 | Van Schijndel et al. | 704/219 |
| 2006/0247929 | A1 * | 11/2006 | Van De Par et al. | 704/233 |

OTHER PUBLICATIONS

Purnhagen, H. "Advances in parametric audio coding" IEEE workshop of signal processing to audio and acoustics, New York, Oct. 1999.*

* cited by examiner

METHOD AND APPARATUS FOR LOW BIT RATE ENCODING AND DECODING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the priority of Korean Patent Application No. 10-2004-0109267 filed on Dec. 21, 2004, in the Korean Intellectual Property Office, the disclosure of which is incorporated herein by reference.

BACKGROUND OF THE INVENTION

1. Field of the Invention

The present invention relates to methods and apparatuses for encoding and decoding, and more particularly, to methods and apparatuses for low bit rate encoding and decoding, which can efficiently compress data at a low bit rate while maintaining high sound quality.

2. Description of Related Art

Information carrier waves are analog signals, which are continuous in time and amplitude. Accordingly, in order to represent the information, carrier waves in a discrete form, analog-to-digital (A/D) conversion is used. A/D conversion comprises two processes: discretion in time (sampling), and quantization of amplitude. Sampling is a process that converts time continuous signals into time discrete signals. Amplitude quantization is a process that defines the number of possible amplitudes of discrete signals. Namely, amplitude quantization replaces input amplitude x(n) by y(n) within a limit of possible amplitude levels.

Generally, digital data is obtained after sampling and amplitude quantization of analog signals. It is then stored in a recording/storage medium, such as a compact disc (CD) or a digital audio tape (DAT), in pulse code modulation (PCM) format to be reproduced as needed. The PCM scheme for storage and reproduction helps to improve sound quality and to prevent degradation over time in comparison with any other analog scheme, but has a problem in the storage and communication of large amounts of data.

To solve this problem of the PCM scheme, differential pulse code modulation (DPCM) and adaptive differential pulse code modulation (ADPCM) schemes have been developed. Using these schemes, attempts have been made to reduce the amount of digital audio data, however, their efficiencies vary greatly depending on signal types. In the Moving Pictures Experts Group (MPEG)/audio scheme, which recently have been standardized by the International Standard Organization (ISO), or in the AC-2/AC-3 scheme, developed by Dolby Laboratories Inc., the human psychoacoustic model has been used to efficiently reduce the amount of data.

In known audio data compression schemes, such as MPEG-1/audio, MPEG-2/audio, or AC-2/AC-3, signals in the time domain, which are grouped into blocks of a set size, are transformed into signals in the frequency domain. The transformed signals are then subjected to scalar quantization using the human psychoacoustic model. The scalar quantization is simple, but not optimal, even when input samples are statistically independent, and it is certain to be at a great insufficiency when input samples are statistically dependent. To compensate for this, lossless compression encoding, such as entropy encoding or another type of adaptive quantization, is incorporated into the encoding process. Consequently, audio data compression schemes become much more complicated than those that only stores PCM data, and have bitstreams containing not only quantized PCM data but also additional information for data compression.

An MPEG/audio standardized scheme or an AC-2/AC-3 scheme provides sound quality comparable to that of a compact disc, at one-eighth to one-sixth of data of other known digital encoding methods, and at a bit rate of between 64 and 384 kbps. Thus, the MPEG/audio standard is expected to play an important role in storing and communicating audio signals in multimedia systems, such as digital audio broadcasting (DAB), audio on demand (AOD), and Internet phones.

Unfortunately, when encoding at low bit rate below 32 kbps, the encoding method with only signal quantization lacks available bits to encode. Accordingly, there is a need to have an efficient method for low bit rate compression of audio signals that can maintain close-to-original sound reproduction.

BRIEF SUMMARY

An aspect of the present invention provides a method and apparatus for low bit rate encoding and decoding, which provides efficient data compression and close-to-original sound reproduction.

According to an aspect of the present invention, there is provided an method of low bit rate encoding including transforming input audio signals in a time domain into spectral signals in a frequency domain, extracting important-spectrum components from the spectral signals in the frequency domain, and quantizing the important-spectrum components, extracting residual-spectrum components other than the important-spectrum components from the spectral signals in the frequency domain, and calculating and quantizing a noise level of the residual-spectrum components, and encoding the quantized important-spectrum components and the quantized noise level losslessly, and outputting encoded bitstreams.

According to another aspect of the present invention, there is provided an apparatus for low bit rate encoding including an important-spectrum component processing unit that extracts important-spectrum components from a spectral signal in a frequency domain and quantizes the important-spectrum components, a noise component processing unit that extracts residual-spectrum components other than the important-spectrum components from the spectral signal in the frequency domain, and calculates and quantizes noise levels for the residual-spectrum components, and a lossless encoding unit that encodes the important-spectrum components and the noise level losslessly, and outputs encoded bitstreams.

According to still another aspect of the present invention, there is provided an method of low bit rate decoding including decoding input bitstreams into spectral signals losslessly, dequantizing quantized important-spectrum components of decoded spectral signals, dequantizing noise level of additional information of the decoded spectral signals to generate noise components, combining the dequantized important-spectrum components and the noise components to be output as spectral signals in a frequency domain, and generating spectral signals in a time domain from the spectral signals in the frequency domain.

According to still another aspect of the present invention, there is provided an apparatus for low bit rate decoding including a lossless decoding unit that decodes input bitstreams into spectral signals losslessly, an important-spectrum component dequantizing unit that dequantizes quantized important-spectrum components of the decoded spectral signals, a noise component processing unit that dequantizes a noise level of additional information of the decoded spectral signals to generate noise components, a spectrum combining unit that combines the dequantized important-spectrum components and the noise components to be output as spectral signals in a frequency domain, and a signal generating unit that generates spectral signals in a time domain from the spectral signals in the frequency domain.

According to still other aspects of the present invention, there are provided computer-readable storage media encoded with processing instructions for causing a processor to execute the above-described methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
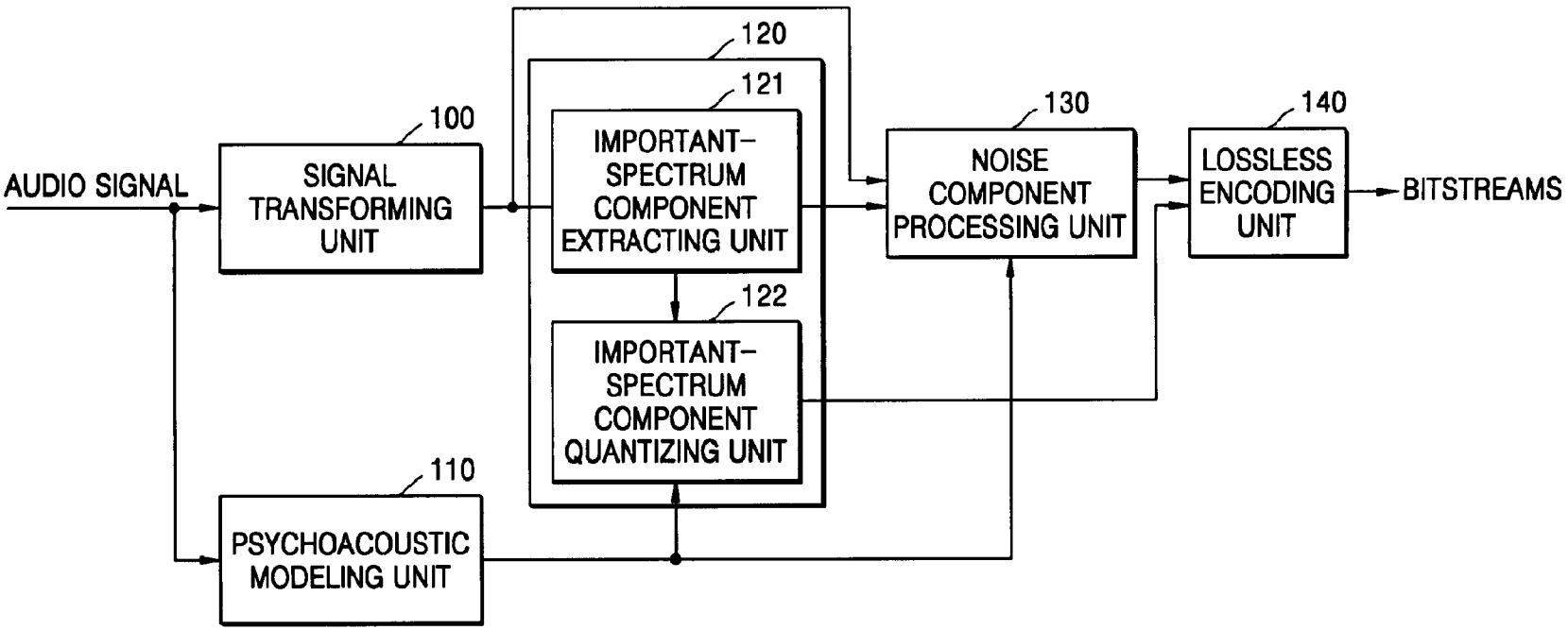
FIG. 1 is a block diagram of an apparatus for low bit rate encoding, according to the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an apparatus for low bit rate audio encoding, according to an embodiment of the present invention. The apparatus includes a signal transforming unit 100, a psychoacoustic modeling unit 110, an important-spectrum component processing unit 120, a noise component processing unit 130, and a lossless encoding unit 140.

The signal transforming unit 100 transforms audio signals in the time domain into spectral signals in the frequency domain. A modified discrete cosine transform (MDCT) can be applied to make the time-to-frequency transformation. In addition, certain frequency components are divided into several sub-bands in the signal transforming unit 100.

The psychoacoustic modeling unit 110 calculates encoding bit-assignment information for each sub-band created by the signal transforming unit 100 to remove perceptual redundancy due to characteristics of the human auditory system. The psychoacoustic modeling unit 110 exploits human auditory characteristics to omit information to which the human auditory system is insensitive, and assigns separate bits for each frequency to reduce the amount of coding. It calculates encoding bit-assignment information in the context of psychoacoustics, and outputs the calculated information to the important-spectrum component processing unit 120 and the noise component processing unit 130.

The important-spectrum component processing unit 120 extracts important-spectrum components from spectral signals in the frequency domain, output by the signal transforming unit 100, and quantizes the important-spectrum components. The important-spectrum component processing unit 120 comprises an important-spectrum component extracting unit 121 and an important-spectrum component quantizing unit 122. The important-spectrum component extracting unit 121 determines and extracts important spectrum components for each spectrum range. The important-spectrum component quantizing unit 122 quantizes the important spectrum components extracted by the important-spectrum component extracting unit 121 at a bit rate according to the encoding bit-assignment information output by the psychoacoustic modeling unit 110.

The noise component processing unit 130 extracts residual-spectrum components other than important-spectrum components, and calculates and quantizes a noise level for the residual-spectrum components. The noise component processing unit 130 will later be explained in more detail.

The lossless encoding unit 140 receives quantized spectral signals from the important-spectrum component processing unit 120 and the noise component processing unit 130, losslessly encodes the spectral signals, and outputs encoded bitstreams. Lossless encoding, such as the Huffman coding and arithmetic coding can achieve efficient compression for encoding.

Figure 2:
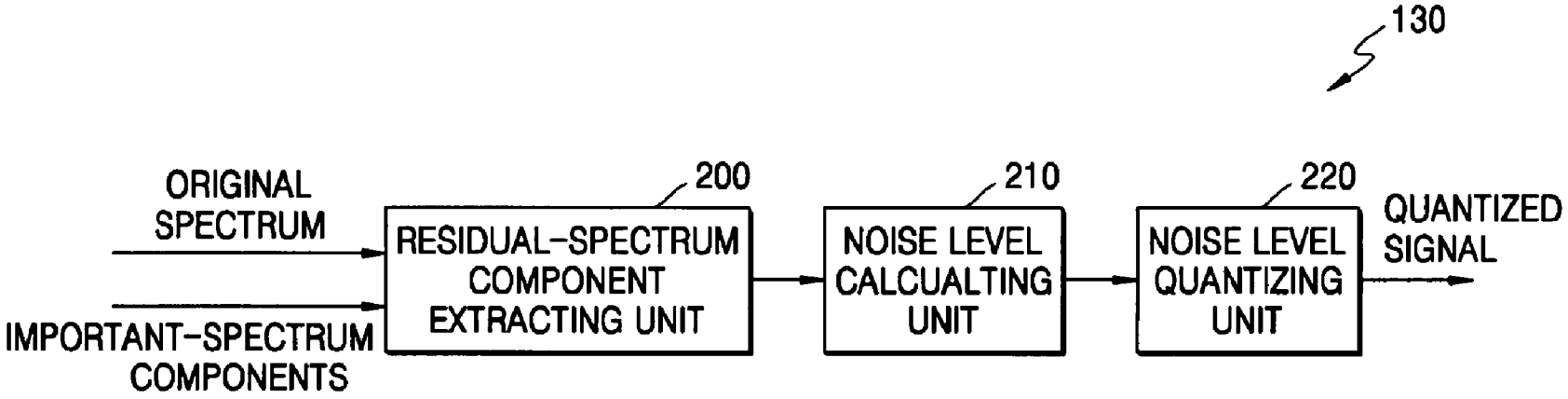
FIG. 2 is a detailed block diagram of a noise component processing unit of FIG. 1.

FIG. 2 is a detailed block diagram of the noise component processing unit 130 of FIG. 1. The noise component processing unit 130 comprises a residual-spectrum component extracting unit 200, a noise level calculating unit 210, and a noise level quantizing unit 220.

Referring to FIGS. 1 and 2, the residual-spectrum component extracting unit 200 obtains the difference between the original spectrum signal and the important-spectrum component signal extracted by the important-spectrum component extracting unit 121, to extract residual-spectrum components. The noise level calculating unit 210 divides the residual-spectrum components into predetermined sub-bands, and calculates noise levels for each of the sub-bands. The noise level quantizing unit 220 quantizes noise levels at a bit rate according to the encoding bit-assignment information from the psychoacoustic modeling unit 110.

Figure 3:
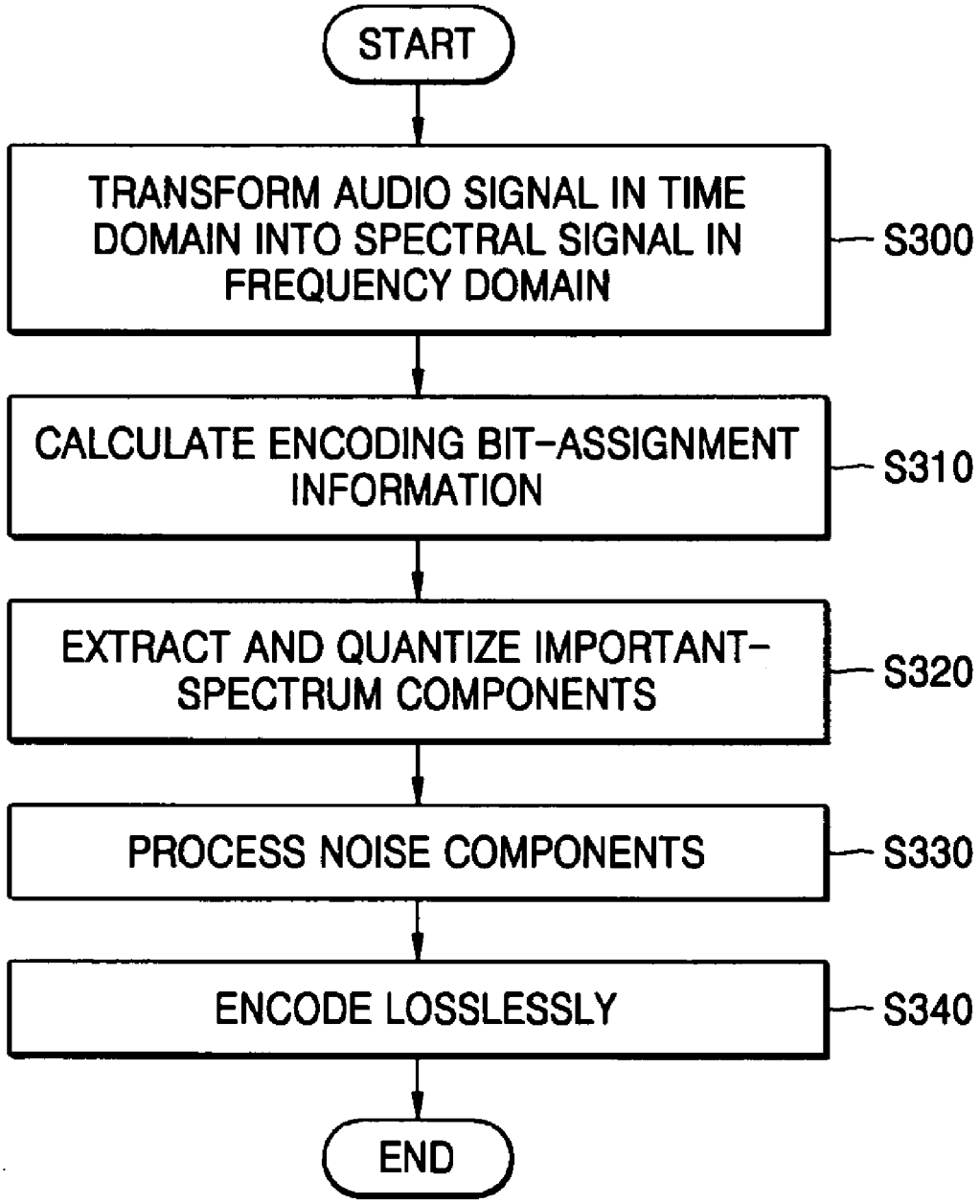
FIG. 3 is a flowchart illustrating a method for low bit rate encoding.

FIG. 3 is a flowchart that illustrates a method for low bit rate encoding according to an embodiment of the present invention.

Figure 5A:
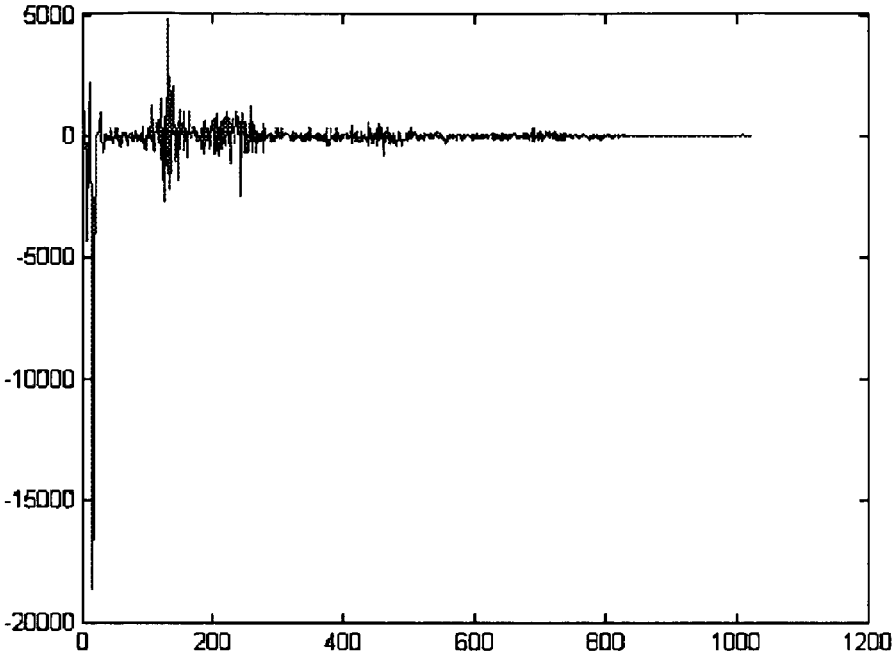
FIGS. 5A through 5D are exemplary signal spectrum plots resulting from the processing of a frequency signal, according to the present invention.

Referring to FIGS. 1 and 3, in operation S300, the signal transforming unit 100 transforms an audio signal in the time domain into a spectral signal in the frequency domain. MDCT can be applied for the time/frequency transformation. The signal transforming unit 110 then divides certain frequency components into sub-bands. FIG. 5A shows an MDCT spectrum X of a spectral signal in the frequency domain.

In operation S310, the psychoacoustic modeling unit 110 calculates encoding bit-assignment information to be assigned to each of the sub-bands, in order to remove perceptual redundancy that occurs due to human auditory characteristics. The psychoacoustic modeling unit 110 calculates the encoding bit-assignment information in terms of psychoacoustics, thereby assigning more bits to higher auditory perceptual frequencies and fewer bits to lower auditory perceptual frequencies.

Figure 5B:
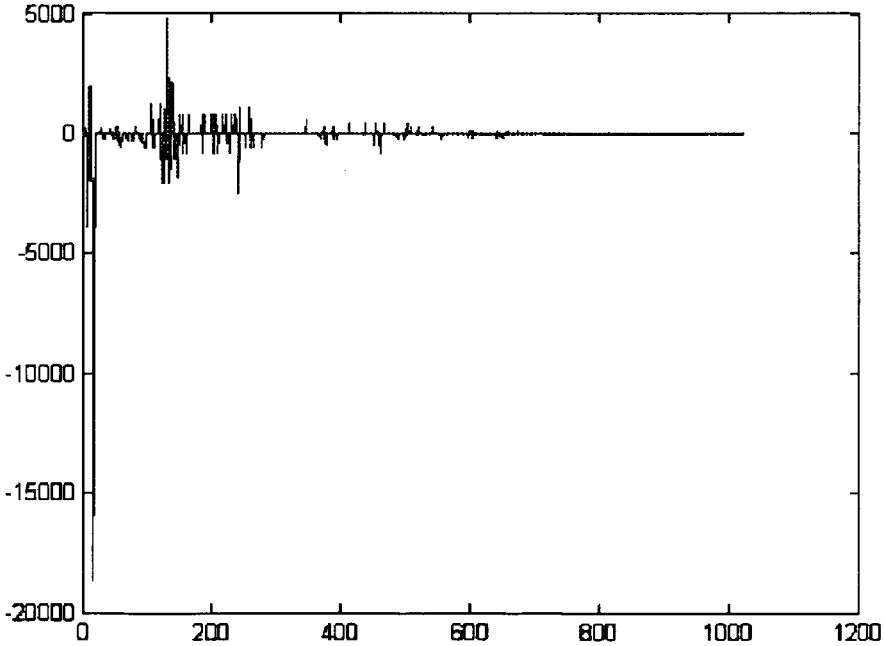

In operation S320, the important-spectrum component processing unit 120 extracts important-spectrum components from the spectral signal in the frequency domain output by the signal transforming unit 100 and quantizes the important-spectrum components. FIG. 5B shows spectrum Y of the important-spectrum components extracted from the MDCT spectrum X of FIG. 5A. Here a predetermined range of spectrum components around the important-spectrum components are all set to "0". Magnitudes, nAround, of one-sided range of spectrum components to be set to "0" are shown in Table 1.

TABLE 1

| Frame length (nLenFrame) | Magnitude of one-sided range of spectrum components around important-spectrum components (nAround) |
|---|---|
| 2048 | 10 |
| 1536 | 8 |
| 1280 | 6 |
| 1024 | 5 |
| 768 | 4 |
| 576 | 3 |
| 512 | 3 |
| 320 | 2 |
| 128 | 1 |

In operation S330, the noise component processing unit 130 extracts residual-spectrum components other than the important-spectrum components from the spectral signal in the frequency domain, calculates noise levels for the residual-spectrum components, and quantizes the noise levels. Operation S330 will later be explained in more detail.

In operation S340, the lossless encoding unit 140 receives the quantized spectral signal from the important-spectrum component processing unit 120 and the noise component processing unit 140 losslessly encodes the quantized spectral signal, and output encoded bitstreams in hierarchical format. The encoded bitstream comprises quantized data of the important-spectrum components and additional noise level information.

Figure 4:
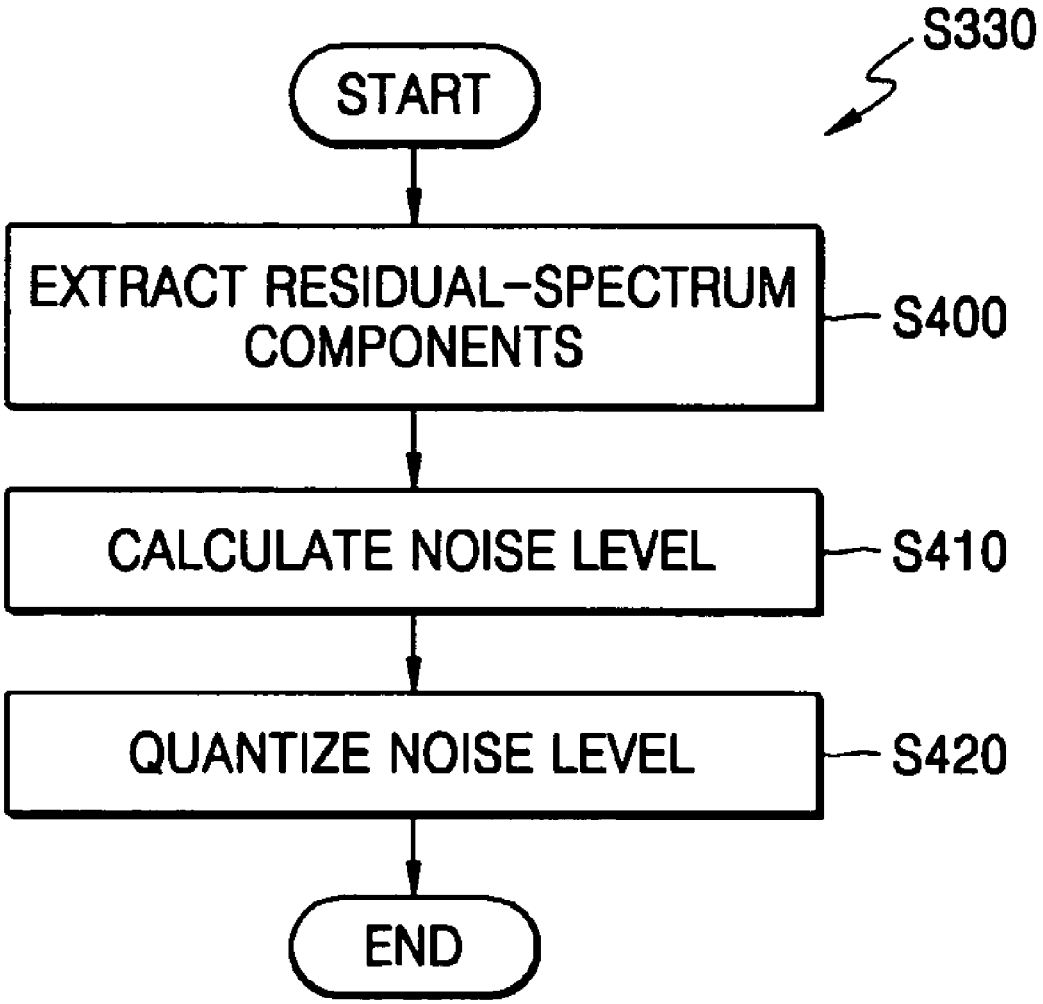
FIG. 4 is a detailed flowchart illustrating operation S330 of FIG. 3.

FIG. 4 is a flowchart that illustrates operation S330 in more detail, which will be explained in combination with FIGS. 1 and 2.

Figure 5C:
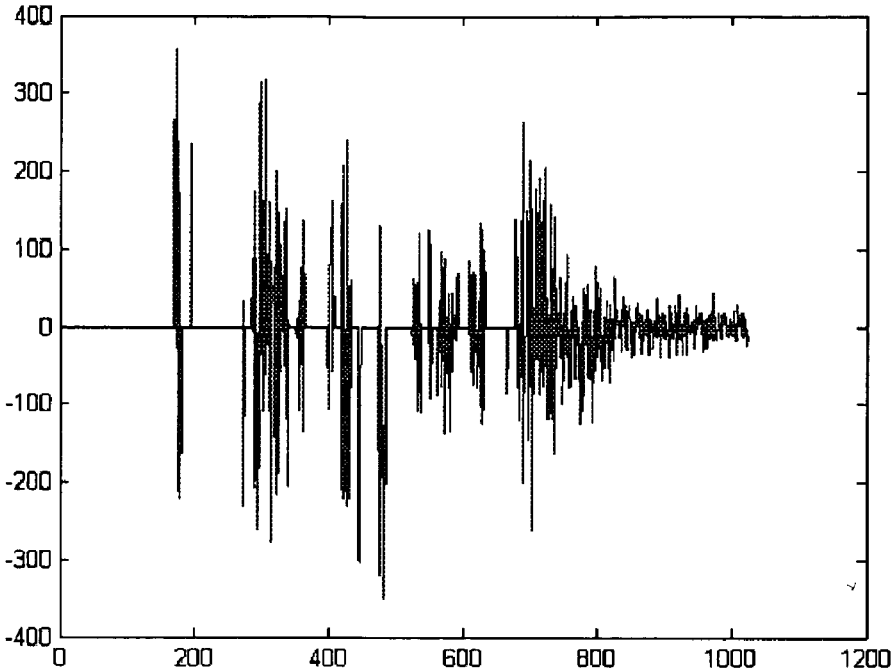

Referring to FIGS. 1, 2, and 4, in operation S400, the residual-spectrum component extracting unit 200 obtains a difference between the original spectrum signal and the important-spectrum component signal extracted from the important-spectrum component extracting unit 121, to extract the residual-spectrum components. FIG. 5C shows residual-spectrum Z that resulted from excluding important-spectrum Y in FIG. 5B from original spectrum X in FIG. 5A.

In operation S410, the noise level calculating unit 210 divides the residual-spectrum components into predetermined sub-bands and calculates noise levels for various magnitudes of noise for each of the sub-bands.

The magnitudes of noise can be obtained by performing linear prediction analysis for each of the sub-bands. The linear prediction analysis is performed by using methods such as a well-known autocorrelation method, a covariance method, the Durbin's method, etc. Through linear prediction analysis, noise components for the current frame can be estimated. If it is estimated that there are more noise components than tone components in the current frame, the magnitude of the noise is transmitted as it is. Otherwise, if it is estimated that there are less noise components than there are tone components in the current frame, the magnitude of the noise is reduced prior to being transmitted. In addition, in the case of a small window where noise components are abruptly changing, the magnitude of the noise is further reduced before being transmitted.

The noise level can be obtained by the following equation:

$$aNoise=\sqrt{Energy/nCountFreq}\times dNoise\times\alpha \quad (1)$$

where, Energy is the energy of the sub-band, nCountFreq is the number of non-zero spectrum components, dNoise is the calculated magnitude of the noise for the sub-band, and $\alpha$ is a perceptual weight constant determined by the noise characteristics. $\alpha$ is selected to be smaller (e.g., 0.3) for a temporary noise (where data is transformed using a short window), and $\alpha$ is selected to be greater (e.g., 0.7) for a constant noise, such as white noise (where data is transformed using a long window).

In operation S420, the noise level quantizing unit 220 quantizes the noise level at a bit rate according to the encoding bit-assignment information input by the psychoacoustic modeling unit 110.

Figure 6:
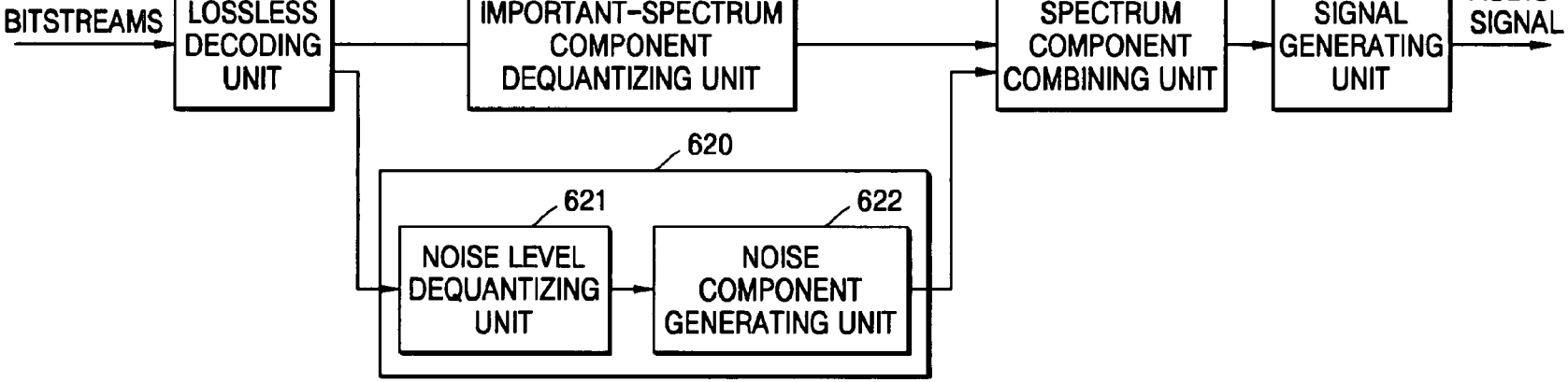
FIG. 6 is a block diagram of an apparatus for low bit rate decoding, according to the present invention.

FIG. 6 is a block diagram of a low bit rate decoding apparatus according to an embodiment of the present invention. The apparatus comprises a lossless decoding unit 600, an important-spectrum component dequantizing unit 610, a noise level processing unit 620, a spectrum component combining unit 630, and a signal generating unit 640.

The lossless decoding unit 600 losslessly decodes received bitstreams, and outputs spectral signals to the important-spectrum component dequantizing unit 610 and the nose level processing unit 620. More specifically, the lossless decoding unit 600 extracts data and additional information from bitstreams in hierarchical format.

The important-spectrum component dequantizing unit 610 dequantizes important-spectrum components of the decoded spectral signal.

The noise level processing unit 620 comprises a noise level dequantizing unit 621 that dequantizes the noise level in the decoded spectral signal, and a noise component generating unit 622 that generates a noise component from the dequantized noise level for the remaining range other than the [predetermined] range for the important-spectrum component.

The spectrum component combining unit 630 combines the dequantized important-spectrum components and the noise components to be output as a spectral signal in the frequency domain.

The signal generation unit 640 generates an audio signal in the time domain from the spectral signal in the frequency domain.

Figure 7:
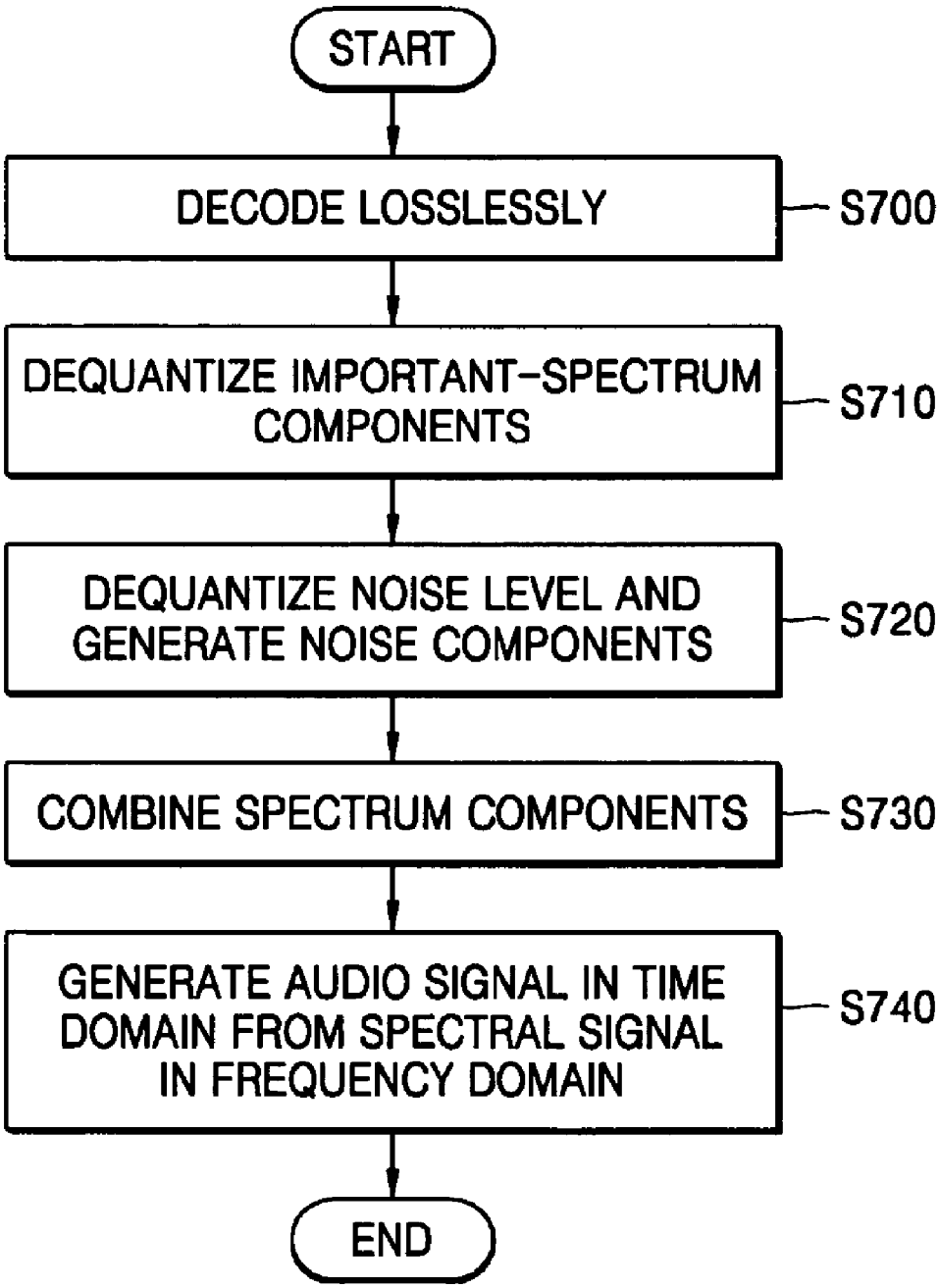
FIG. 7 is a flowchart illustrating a method for low bit rate decoding, according to the present invention.

FIG. 7 is a flowchart that illustrates a method of low bit rate decoding according to an embodiment of the present invention, which will now be explained in combination with FIG. 6.

Referring to FIGS. 6 and 7, in operation S700, the lossless decoding unit 600 performs the opposite procedure of the lossless encoding unit 140 on the received encoded bitstream, resulting in a decoded spectral signal to be output to the important-spectrum component dequantizing unit 610 and the noise level processing unit 620. More specifically, the lossless decoding unit 600 extracts quantized data and additional information from the bitstream in hierarchical format. Lossless decoding is achieved by either arithmetic decoding or Huffman decoding.

In operation S710, the important-spectrum component dequantizing unit 610 dequantizes the important-spectrum components of the quantized data of the decoded spectral signal.

In operation S720, the noise level processing unit 620 dequantizes the noise level of the additional information from the decoded spectral signal to generate noise components. The noise level dequantizing unit 621 then dequantizes the noise level of the decoded spectral signal, and the noise component generating unit 622 generates noise components for the remaining range other than a [predetermined] range [around] *for* the important-spectrum component.

Figure 5D:
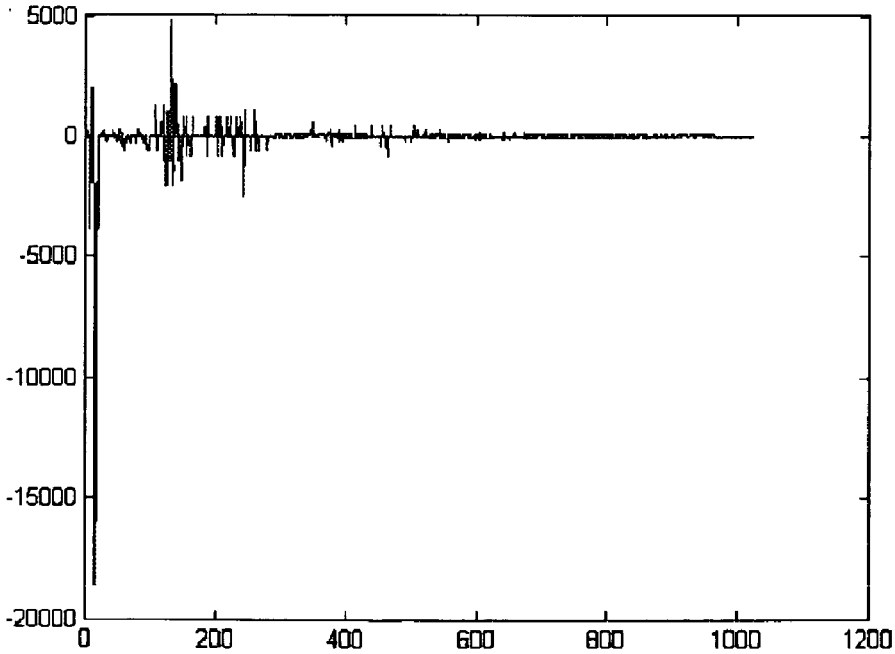

In operation S730, the spectrum component combining unit 630 combines the dequantized important-spectrum components and the noise components to output as spectral signals in the frequency domain. FIG. 5D shows a signal spectrum resulting from the combination of important-spectrum components and noise components. As shown in FIG. 5D, noise components are significantly reduced compared to the original spectrum signal of FIG. 5A.

In operation S740, the signal generating unit 640 generates audio signals in the time domain from the spectral signals in the frequency domain.

It is possible for the methods of low bit rate encoding and decoding, according to the above-described embodiments of the present invention to be implemented as a computer program. Codes and code segments constituting the computer program may readily be inferred by those skilled in the art. The computer programs may be recorded on computer-readable media and read and executed by computers. Such computer-readable media include all kinds of storage devices, such as ROM, RAM, CD-ROM, magnetic tape, floppy discs, optical data storage devices, etc. The computer-readable media may be distributed to computer systems connected to a network, and codes on the distributed computer-readable media may be stored and executed in a decentralized fashion.

According to the above-described embodiments of the present invention, by separately encoding important-spectrum components and noise components of an audio signal, efficient data compression and high fidelity to the original sound can be achieved.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

[1. A method of low bit rate encoding comprising:

transforming input audio signals in a time domain into spectral signals in a frequency domain;

extracting spectrum components from the spectral signals in the frequency domain, and quantizing the spectrum components based on a psychoacoustic analysis of the spectral signals;

extracting residual-spectrum components other than the spectrum components from the spectral signals in the frequency domain, and calculating and quantizing a noise level corresponding to noise components of the residual-spectrum components based on the psychoacoustic analysis of the spectral signals; and encoding the quantized spectrum components and the quantized noise level losslessly, without the noise components, and outputting encoded bitstreams.]

[2. The method of claim 1, wherein the quantizing of the spectrum components based on the psychoacoustic analysis of the spectral signals comprises:

modeling the audio signal in the time domain in a context of human perceptual auditory characteristics, prior to extracting the spectrum components from the spectral signal in the frequency domain, and quantizing the spectrum components, wherein a perceptually important component is selected using the modelling result, and the spectrum components and noise level are quantized up to the number of bits assigned according to the encoding bit-assignment information.]

[3. The method of claim 1, wherein the extracted spectrum components are obtained by zeroing a predetermined range of spectrum components around the spectrum components.]

[4. The method of claim 1, wherein the extracting residual-spectrum components other than the spectrum components from the spectral signal in the frequency domain, and calculating and quantizing a noise level of the residual-spectrum components comprises:

extracting residual-spectrum components other than the spectrum components from the spectral signal in the frequency domain;

dividing the residual-spectrum components into sub-bands, and calculating noise levels for a magnitude of a noise of each of the sub-bands; and quantizing the calculated noise levels.]

[5. The method of claim 4, wherein the magnitude of the noise is obtained by estimating an extent of the noise according to a linear expectation analysis.]

[6. The method of claim 4, wherein the noise level, aNoise, is calculated by:

$$aNoise=\sqrt{Energy/nCountFreq}\times dNoise\times\alpha, \text{ and}$$

wherein Energy is the energy of the sub-band, nCountFreq is a number of non-zero spectrum components, dNoise is a calculated magnitude of the noise for the sub-band, and $\alpha$ is a perceptual weight constant determined by noise characteristics.]

[7. An apparatus for low bit rate encoding, comprising:

a spectrum component processing unit that extracts spectrum components from a spectral signal in a frequency domain and quantizes the spectrum components;

a psychoacoustic modeling unit performing a psychoacoustic analysis of the spectral signals;

a noise component processing unit that extracts residual-spectrum components other than the spectrum components from the spectral signal in the frequency domain, and calculates and quantizes noise levels corresponding to noise components of the residual-spectrum components based on the psychoacoustic analysis performed by the psychoacoustic modeling unit; and a lossless encoding unit that losslessly encodes the spectrum components and the noise level, without the noise components and outputs encoded bitstreams.]

[8. The apparatus of claim 7, further comprising:

the psychoacoustic modeling unit that models an input audio signal in a time domain by human perceptual auditory characteristics, and calculates encoding bit-assignment information, wherein the spectrum component processing unit and the noise component processing unit quantize the spectrum components and the noise level, respectively, up to the number of bits assigned according to the encoding bit-assignment information.]

[9. The apparatus of claim 7, wherein the noise component processing unit comprises:

a residual-spectrum component extracting unit that extracts residual-spectrum components other than the spectrum components from the spectral signal in the frequency domain;

a noise level calculation unit that divides the residual-spectrum components into sub-bands, and calculates noise levels for magnitudes of noise of the sub-bands; and a noise level quantizing unit that quantizes the noise level.]

[10. A computer-readable storage medium encoded with processing instructions for causing a processor to execute a method of low bit rate encoding, the method comprising:

transforming an input audio signal from the time domain to the frequency domain;

extracting spectrum components from a spectral signal in a frequency domain, and quantizing the spectrum components based on a psychoacoustic analysis of the spectral signals;

extracting residual-spectrum components other than the spectrum components from the spectral signal in the frequency domain, and calculating and quantizing a noise level corresponding to noise components of the residual-spectrum components based on the psychoacoustic analysis of the spectral signals; and encoding the quantized spectrum components and the quantized noise level losslessly, without the noise components, and outputting encoded bitstreams.]

11. A method of low bit rate decoding, comprising:

[decoding input bitstreams into spectral signals losslessly] *lossless-decoding, performed by at least one processor, a bitstream to obtain quantized spectrum components*;

dequantizing *the* quantized spectrum components[, of decoded spectral signals, surrounded by spectrum components during an encoding of the input bitstream that were quantized to zero within the encoding];

dequantizing a noise level of [additional information of the decoded spectral signals and] *a subband from the bitstream in order to obtain a dequantized noise level;* generating *a respective* noise [components] *component,* using the dequantized noise level, for [residue] *each* spectrum [components] *component set to zero* other than [the] *each* spectrum [components] *component set to non-zero*; and

[generating spectral signals in a frequency domain using the dequantized] *replacing each of* spectrum [components and the] *components set to zero with its respective* noise [components] *component; and*

*generating a digital audio signal, based on the replacing and the spectrum component set to non-zero of the subband for audio reproduction,*

*wherein in the replacing, a frequency range of spectrum components set to zero around the spectrum component set to non-zero for which their noise components are to be replaced is determined based on a frame length.*

12. The method of claim 11, wherein the [dequantizing the noise level of additional information of the decoded spectral signals to generate] *generating the* noise [components] *component*, comprises:

[dequantizing the noise level of the additional information of the decoded spectral signals; and]

generating *the respective* noise [components] *component* from the noise level excluding a predetermined range around the spectrum components.

13. An apparatus for low bit rate decoding, comprising:

a lossless decoding unit *implemented by a processor* that [decodes input bitstreams into spectral signals losslessly] *lossless-decodes a bitstream to obtain quantized spectrum components*;

a spectrum component dequantizing unit *implemented by the processor* that dequantizes *the* quantized spectrum components[, of the decoded spectral signals, surrounded by spectrum components during an encoding of the input bitstream that were quantized to zero within the encoding];

a noise component processing unit *implemented by the processor* that dequantizes a noise level of [additional information of the decoded spectral signals] *a subband from the bitstream in order to obtain a dequantized noise level* and generates *a respective* noise [components] *component* using the dequantized noise level, for [residue] *each* spectrum [components] *component set to zero* other than [the] *each* spectrum [components] *component set to non-zero*;

a spectrum combining unit *implemented by the processor* that [combines] *replaces each of* the [dequantized] spectrum [components and the] *components set to zero with its respective* noise [components] *component* to be output as *a* spectral [signals] *signal* in a frequency domain; and a signal generating unit *implemented by the processor* that generates [spectral signals in a time domain from the spectral signals in the frequency domain] *a digital audio signal, based on the replacing and the spectrum component set to non-zero of the subband for audio reproduction,*

*wherein in the replacing, a frequency range of spectrum components set to zero around the spectrum component set to non-zero for which their noise components are to be replaced is determined based on a frame length.*

14. The apparatus of claim 13, wherein the noise component processing unit comprises:

[a noise level dequantizing unit that dequantizes the noise level of the additional information of the decoded spectral signals; and]

a noise component generating unit *implemented by the processor* that generates [components] *the respective noise component* from the [dequantized] noise level for a range excluding the range of the spectrum components.

15. A non-transitory computer-readable storage medium encoded with processing instructions for causing a processor to execute a method of low bit rate decoding, comprising:

[decoding input bitstreams into spectral signals losslessly] *lossless-decoding, performed by at least one processor, a bitstream to obtain quantized spectrum components*;

dequantizing *the* quantized spectrum components[, of decoded spectral signals, surrounded by spectrum components during an encoding of the input bitstream that were quantized to zero within the encoding];

dequantizing a noise level of [additional information of the decoded spectral signals and] *a subband from the bitstream in order to obtain a dequantized noise level;* generating *a respective* noise [components] *component,* using the dequantized noise level, for *each* spectrum [components] *component set to zero* other than [the] *each* spectrum [components quantized] *component set* to non-zero; [and]

[generating spectral signals in a frequency domain using the dequantized] *replacing each of* spectrum components [and the] *set to zero with its respective* noise [components] *component; and*

*generating a digital audio signal, based on the replacing and the spectrum component set to non-zero of the subband for audio reproduction,*

*wherein in the replacing, a frequency range of spectrum components set to zero around the spectrum component*

*set to non-zero for which their noise components are to be replaced is determined based on a frame length.*

* * * * *